United States Patent [19]
Nikolsky et al.

[11] 3,773,642
[45] Nov. 20, 1973

[54] ELECTRON-CONDUCTIVE GLASS
[76] Inventors: Boris Petrovich Nikolsky, 2 Murinsky prospekt, 44, kv. 92; Mikhail Mikhailovich Shults, Novocherkassky prospekt, 66, kv. 39; Alexandr Moiseevich Pisarevsky, Kronverxaya, 29, kv. 109; Anatoly Alexandrovich Beljustin, ulitsa Sojuza Pechatnikov, 25-a, kv. 39; Sofia Konstantinovna Bolkhontseva, ulitsa Dekabristov, 16, kv. 19, all of Leningrad; Vladimir Alexandrovich Dolidze, prospekt Rustaveli 1, kv. 68, Tbilisi; Valentina Mikhailovna Tarasova, prospekt Plekhanova, 148, kv. 19, Tbilisi; Julia Mikhailovna Karachentseva, Tovarny poselok, 6 ulitsa, 28, kv. 4, Tbilisi; Liana Iosifovna Dolmazova, Kakhetinskoe shosse, 21, kv. 21, Tbilisi, all of U.S.S.R.

[22] Filed: July 13, 1971
[21] Appl. No.: 162,245

[52] U.S. Cl. ............... 204/195 G, 204/1 T, 106/52
[51] Int. Cl. ............................... G01n 27/36

[58] Field of Search ............... 106/52; 204/1 T, 204/195 G

[56] References Cited
UNITED STATES PATENTS
2,483,299   9/1949   Paullt ........................... 204/195 G
3,226,313  12/1965   Riseman ....................... 204/195 G OTHER PUBLICATIONS
"Chemical Abs." Vol. 70, 1969, 43344 c, p. 496.
"Science", Vol. 126, Oct. 1957, pp. 831–834.

Primary Examiner—T. Tung
Attorney—Eric H. Waters et al.

[57] ABSTRACT

An electron-conductive glass having the following composition, percent by weight: $SiO_2$, 45–65; $Fe_2O_3$, 25–50; $Na_2O$, 4–15, and $Li_2O$, 2–10. The glass of said composition is used for making the sensitive element of a glass electrode intended for oxidation potential measurements in liquid media. A high percentage of ferric oxide provides for significant exchange currents at the glass-test solution boundary, whereas the alkali metal oxides suppress the ionic conductivity.

4 Claims, 1 Drawing Figure

PATENTED NOV 20 1973
3,773,642
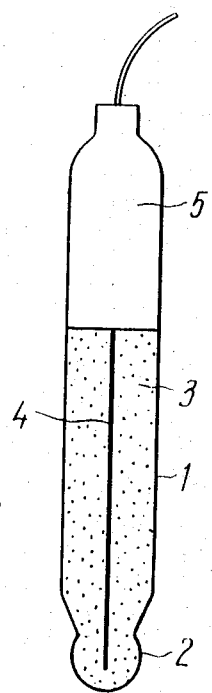

ELECTRON-CONDUCTIVE GLASS

This invention relates to improvements in means for potentiometric analysis in liquid media and, more particularly, to electron-conductive glass suitable for fabricating the sensitive elements of glass electrodes which are intended for measuring the oxidation potential of liquid media.

The electrodes, according to the present invention, appear to be eminently suited for use in the transducers of continuous control and monitoring systems of various technological processes in the chemical, paper-and-pulp, textile and pharmaceutical industries, and also in hydrometallurgy.

The presently known electrodes consist of a hollow glass tube with a lead, a sensitive element being sealed to one end of said tube.

It is known in the art to fabricate the sensitive element of electrodes from lithium silicate or soda-alumina silicate glass which exhibits ionic conductivity, but the electrodes of this type are unsuitable for measuring the oxidation potential of liquid media.

In measuring oxidation potentials, use is generally made of sensitive electrode elements manufactured from a noble metal, such as gold or platinum.

However, the electrodes furnished with sensitive elements made from noble metals, apart from being expensive, suffer from a number of disadvantages, viz., the susceptibility of noble metal sensitive elements to catalytic poisons ($H_2S$ and other sulphur-containing compounds); the presence of gaseous oxygen or hydrogen in the system being analyzed affects the electrode potential, thereby decreasing the accuracy of measurements; and the ability of noble metals to catalyze the decomposition of particular redox systems, e.g., hydrogen peroxide.

Electrodes furnished with a sensitive element made from carbonaceous materials are substantially cheaper, but do not provide adequate accuracy when the oxidation potential is measured in redox systems characterized by buffer-insensitive redox properties.

Currently available types of alkali metal silicate glass exhibit electron-conductivity only at a very high concentration of ferric oxide contained therein, but high ferric oxide percentages impair the technological properties and chemical stability of glass. Moreover, the sensitive element fabricated from said glass makes it possible to measure the oxidation potential but in a narrow range of redox system concentrations.

It is an object of the present invention to provide an electron-conductive glass which will exhibit chemical stability and good technological properties.

It is a further object of the present invention to provide a glass which will make it possible to carry out oxidation potential measurements in a broader range of redox system concentrations.

These and other objects are accomplished, according to the invention by an electron-conductive glass of the following composition, percent by weight: $SiO_2$, 45–65; $Fe_2O_3$, 25–50; $Na_2O$, 4–15; $Li_2O$, 2–10.

The fact that the present glass contains such a considerable percentage of ferric oxide results in high exchange currents at the glass-test solution boundary when the electrode sensitive element is made from said glass, while the presence of two alkali metal oxides is responsible for ionic conductivity suppression and also for good technological properties and high chemical stability of said glass.

The sensitive element exhibiting optimum characteristics is obtained from the glass of the following composition, percent by weight: $SiO_2$, 55; $Fe_2O_3$, 37; $Na_2O$, 4; $Li_2O$, 4 or $SiO_2$, 50; $Fe_2O_3$, 39; $Na_2O$, 7; $Li_2O$, 4.

The present invention is illustrated hereinbelow by the description of examples of preparing the glass, according to the invention, with reference to the accompanying drawing in which the sole FIGURE shows a glass electrode.

The glass of the invention is prepared from chemically pure, pulvurulent oxides pre-dried to constant weight.

The following Table lists the proportions of components (in per cent by weight) of the charge used for cooking the electron-conductive glass, according to the invention.

| Ex. No. Oxide | 1 | 2 | 3 | 4 | 5 | 6 | 7 | 8 |
|---|---|---|---|---|---|---|---|---|
| $Li_2O$ | 4 | 4 | 2 | 2 | 10 | 3 | 2 | 6 |
| $Na_2O$ | 7 | 4 | 15 | 4 | 4 | 4 | 8 | 4 |
| $Fe_2O_3$ | 39 | 37 | 38 | 33 | 40 | 50 | 42 | 25 |
| $SiO_2$ | 50 | 55 | 45 | 61 | 46 | 43 | 48 | 65 |

Glass manufacture is conducted as follows.

A thoroughly mixed charge is placed in a crucible which is inserted in a furnace pre-heated to a temperature of 1,100°C. The furnace temperature is raised to 1,350°C during 4 hours, and the glass melt is maintained at said temperature for a period of 1.5 hours. In the course of heating, the glass melt is periodically stirred. The finished glass melt is poured into moulds.

The glass prepared by the aforesaid procedure is used for making the sensitive element of the electrode shown in the drawing.

The glass is softened in the flame of a burner and transferred to a glass tube end, followed by heating it thoroughly and blowing a bulb therefrom.

Prior to filling the void of the tube 1, a thin glass layer should be removed from the bulb exterior and interior surfaces, since the composition and structure of glass surface layers undergo alteration in the course of sensitive element sealing to the electrode tube.

The electrode for measuring the oxidation potential comprises the glass tube 1, to one end of said tube there is sealed a sensitive element 2 made from the glass of the aforesaid composition. The tube 1 is filled with a conducting material 3, which accommodates a lead 4. The top of the tube 1 is closed with a cap 5.

An electrode furnished with the sensitive element made from the glass, according to the invention, is suitable for determining the oxidation potential in the range of from −200 to +1,200 mV in the pH range of from 3 to 9.

The electrode is operable in the temperature range of from 0° to 90°C and has a resistance of ≤ 1 Mohm.

The glass, according to the invention, is further advantageous in that the presence of catalytic poisons in the test solution does not affect the rate of electron exchange between the glass and the solution being examined.

We claim:

1. An electron-conductive glass consisting of percent by weight: $SiO_2$, 45–65; $Fe_2O_3$, 25–50; $Na_2O$, 4–15; $Li_2O$, 2–10.

2. The glass of claim 1 consisting of by weight 55 percent $SiO_2$, 37 percent $Fe_2O_3$, 4 percent $Na_2O$, and 4 percent $Li_2O$.

3. The glass of claim 1 consisting of by weight 50 percent $SiO_2$, 39 percent $Fe_2O_3$, 7 percent $Na_2O$, and 4 percent $Li_2O$. 33531 6517 bca 305 0000 101073 6790103

4. A glass electrode for measuring the oxidation potential in liquid media, comprising: a tube of high-ohmic glass, a sensitive element of the glass of claim 1 sealed to an end of said tube, and a lead in said tube in electrical contact with said sensitive element.

* * * * *